United States Patent [19]

Nanis

[11] Patent Number: 4,845,816
[45] Date of Patent: Jul. 11, 1989

[54] BURNISHING HEAD FOR MEMORY DISK DRIVE

[75] Inventor: Leonard Nanis, Palo Alto, Calif.
[73] Assignee: Xebec Corporation, San Jose, Calif.
[21] Appl. No.: 244,529
[22] Filed: Sep. 12, 1988

Related U.S. Application Data

[63] Continuation of Ser. No. 888,035, Jul. 18, 1986, abandoned.

[51] Int. Cl.$^4$ .................. B24B 39/06; B24B 7/04; B21C 37/30
[52] U.S. Cl. .................. 29/90.01; 51/132
[58] Field of Search .................. 29/90 R; 51/132

[56] References Cited

U.S. PATENT DOCUMENTS

| | | | |
|---|---|---|---|
| 3,486,274 | 12/1969 | David | 51/132 |
| 3,943,666 | 3/1976 | Dion et al. | 51/132 |
| 4,330,910 | 5/1982 | Schachl et al. | 29/90 R |
| 4,430,782 | 2/1984 | Bornhorst et al. | 29/90 R |

FOREIGN PATENT DOCUMENTS

| | | | |
|---|---|---|---|
| 80728 | 6/1979 | Japan | 29/90 R |
| 81058 | 5/1984 | Japan | 29/90 R |
| 249569 | 12/1985 | Japan | 29/90 R |

OTHER PUBLICATIONS

IBM Technical Disclosure Bulletin vol. 14 No. 5 Oct. 1971 pp. 1444-1445.
IBM Technical Disclosure Bulletin vol. 19 No. 10 Mar. 1977 pp. 3829-3830.
IBM Technical Disclosure Bulletin vol. 20 No. 3 Aug. 1977 pp. 1146-1147.
IBM Technical Disclosure Bulletin, vol. 17, No. 10, 03/1975, p. 3010.

Primary Examiner—Frederick R. Schmidt
Assistant Examiner—William E. Terrell
Attorney, Agent, or Firm—Cushman, Darby & Cushman

[57] ABSTRACT

A contact burnishing head is described for memory surfaces of computer memory disks. The operating surface of the burnishing head is defined by a regular pattern of diamond-shaped protrusions. In one embodiment, a ramp face is provided along the leading edge of the head in order to prevent large asperities in the disk surface from interfering with proper burnishing. In another embodiment, two opposed edges of the head are provided with ramp faces so that a single head design can be used to burnish either the upper or the lower surface of a computer disk.

14 Claims, 2 Drawing Sheets

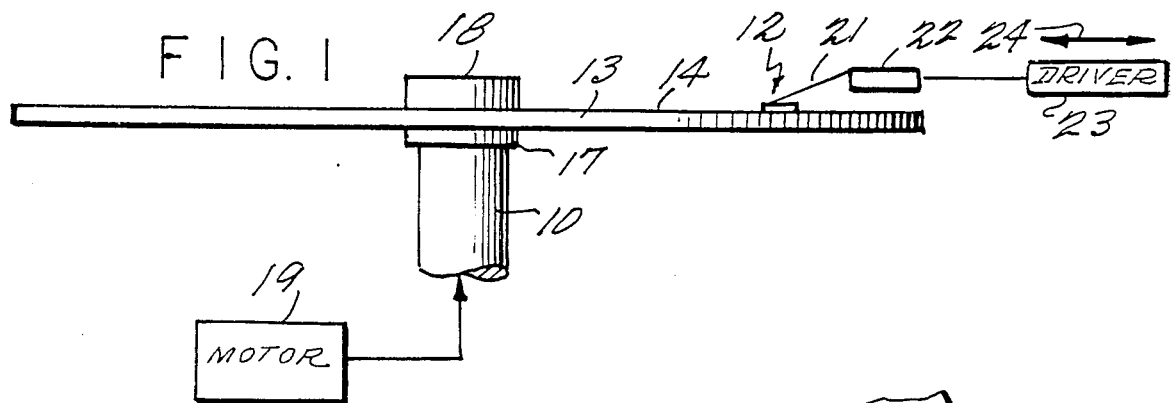
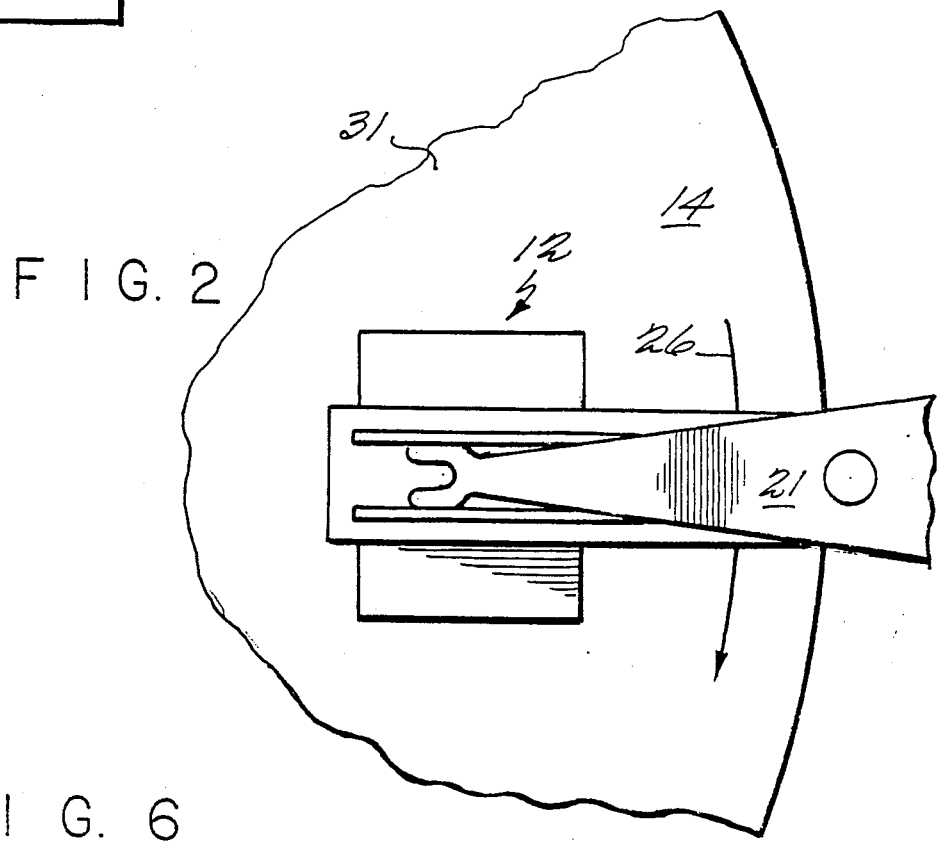
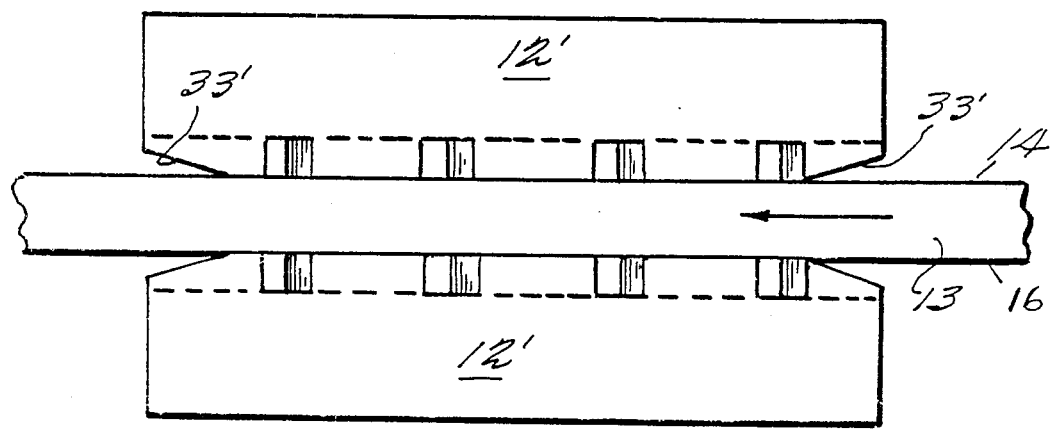

BURNISHING HEAD FOR MEMORY DISK DRIVE

This is a continuation of application Ser. No. 888,035 filed July 18, 1986 now abandoned.

BACKGROUND OF THE INVENTION

This invention relates to the manufacture of memory disks of the type used in the computer field and, more particularly, to a burnishing head and method of burnishing the surface of a memory disk.

Hard (inflexible) disks are used to store information, typically coded information, utilized for data processing. An advantage of such a disk is that it can provide high-speed random access. That is, one can either write or retrieve information from any selected area on a memory surface of such a disk, without having to serially traverse the full memory space of the disk to have access to a selected memory location. Generally, a hard memory disk is mounted within a disk drive which is akin to a record turntable, in that it includes means for rotation of the disk and means for translating a head across the surface of the disk to provide access to a selected annular track. Typically, a plurality of disks, such as two or four, are mounted on a single spindle in spaced relationship to one another and heads are provided to interact with opposite planar surfaces of each of such disks.

The disks now available for hard disk memory arrangements typically are magnetic disks, i.e., each of the surfaces which is to receive and store information is a magnetic surface, such as provided by a thin magnetic film on a substrate. Moreover, the heads which interact with each of the surfaces are so-called "flying" heads, i.e., they do not touch the surface of the disk during its rotation—rather, they ride on an air bearing between the disk and the head caused by the rotation of the disk at high speed. The head which interacts with the surface typically includes the magnetic coil or other mechanism for interacting through space with the disk surface in a non-contact manner. This prevents both wear of either the head or the disk surface which would be caused by a contact transfer of the information between the two during relative movement.

It will be recognized that if asperities (protrusions and the like) on the disk surface encounter a read/write head during high-speed relative movement between the two, an anomaly will be caused. This anomaly could be, for example, damage to the head or at the least an error in the information transfer. Because of such, it is typical in the manufacture of computer disks to burnish the memory surfaces to remove asperities. This generally is achieved by mounting the disk in an arrangement which rotates the same relative to a head in the same manner that the disk is expected to be rotated relative to a magnetic head in a disk drive. A burnishing head, rather than a magnetic head, is provided in the arrangement for removing the asperities as the disk is rotated. Conventionally, the burnishing head is designed as a flying head which passes over the surface to be burnished with a spacing between the two which is less than the normal spacing between a magnetic head and the magnetic surface of the disk. An example of such an arrangement is that described in Volume 17, No. 10, page 3010 (March 1975) of *IBM Technical Disclosure Bulletin.*

Flying burnishing heads, because they do fly, do not provide the uniformity of asperity removal that one would like. That is, contact of the burnishing head with the asperities during flying can result in head-disk surface spacing variations and consequent non-uniform removal. Moreover, many of such flying head arrangements have included only one cutting edge positioned to engage an asperity. This exacerbates the nonuniformity problem since the single cutting edge is expected to remove the entire asperity that it encounters. The high resolution required for greater density of recording being desired results in lower spacing between the head and disk and more of a likelihood that asperities in a recording surface will interfere with proper information recording and/or retrieval. Non-contact (flying) burnishing heads simply cannot provide as smooth a recording surface as desired.

In view of the above, some effort has been made to come up with a satisfactory "contact" burnishing head, i.e., one which remains in contact with the disk surface during the burnishing operation. An example of such a head is described in U.S. Pat. No. 4,330,910. Such head includes a planar surface designed to contact the disk surface, which planar surface includes either a single groove or a pair of crossed grooves providing sharp edges for contacting and removing asperities. The resulting construction results in many asperities being contacted by a single cutting edge, with the result that either a protruding asperity is only partially removed and interferes with continued smooth contact between the head and the disk surface or that removal of the asperity causes a slight gouging or the like to occur in the disk surface. That is, since a single cutting edge has to remove the entire asperity, it is not unusual for the large piece of debris caused by the asperity to gouge the magnetic surface, or the removal to be simply a removal caused by engagement between two moving objects, rather than a clean slice and a controlled removal.

SUMMARY OF THE INVENTION

The instant invention provides a burnishing head for memory surfaces of a computer disk which overcomes the deficiency of the presently designed contact burnishing head mentioned above, and a method of burnishing utilizing the same. In general, the head of the invention has a body which provides a multiplicity of cutters in line with one another, means for maintaining the cutters adjacent a disk surface to be burnished, and means for providing relative movement between the body and the disk surface to present at least two of the cutters sequentially to a single spot to be burnished on the disk surface. Because each spot on the disk surface to be burnished has at least two burnishing cutters presented to the same, it is not necessary that an asperity be completely removed by a single cutter. The result is that an asperity can be removed in stages so that each encounter betweeen the burnishing head and an asperity can be less of a confrontation so that the effect of the confrontation on the disk surface and the path of the head is correspondingly less.

Most desirably, the cutting surface of the burnishing head is generally planar, and each of the cutters is one or more cutting edges defined by depressions in the surface. The result is that those portions of a disk surface which do not have protrusions face a planar surface, thereby reducing the possibility of the cutting edges of the body digging into or gouging such disk surface. The depressions most desirably provide channels which are adjacent each of the cutters for removing debris from asperities, without such debris necessarily being between the burnishing head and the disk surface and possibly causing scratches or gouges. The generally planar surface of the head preferably is defined by a regular pattern of diamond-shaped protrusions, each of which provides two linear cutting edges which intersect at a point, and each of which is separated by a channel from adjacent diamond-shaped protrusions. This pattern assures that the body has a multiple number of cutting edges both in line with one another as aforesaid to be presented sequentially to a single spot on the surface of the disk, and in a direction generally orthogonal thereto so that more than one spot of the disk surface is swept upon the relative movement.

Most desirably, the burnishing head includes a leading edge ramp, i.e., that portion of the body which first confronts a spot on the surface of a disk is inclined away from the disk surface relative to the following section of the head surface which provides the major portion of the cutting action. This inclined leading edge decreases the possibility that there will be an abrupt confrontation between the head and any major asperity. The leading ramp also most desirably includes cutters so that the major asperities will be reduced in size before being presented to the main cutting section.

As another aspect of the invention, two opposed edges of the burnishing head adjacent the main cutting section are provided with ramp faces which are inclined away from such cutting section. The result is that leading ramps will be presented to a disk surface in two different directions of relative movement between the burnishing head and the surface. In this connection, most computer memory disks have two memory surfaces, i.e., the two opposite sides of the disk are both coated with a thin magnetic film or otherwise made to act as an information memory surface. The provision of inclined ramps on two opposed edges avoids the necessity for maintaining two different burnishing heads in inventory to burnish the opposed surfaces simultaneously.

The invention further includes a method of burnishing resulting in most efficient cutting. That is, each head is mounted at an orientation which assures optimum cutting at the direction of relative movement as discussed below, and each head is maintained in such orientation.

BRIEF DESCRIPTION OF THE FIGURES

With reference to the accompanying two sheets of drawing:

FIG. 1 is a schematic elevation view of burnishing apparatus in incorporating the burnishing head of the invention;

FIG. 2 is an enlarged partial planar view illustrating the burnishing head of the invention maintained in contact with the surface of a computer disk;

FIG. 6 is an elevational view similar to FIG. 4 of an alternate embodiment of the invention.

DETAILED DESCRIPTION OF THE PREFERRED EMBODIMENTS

Figure 3:
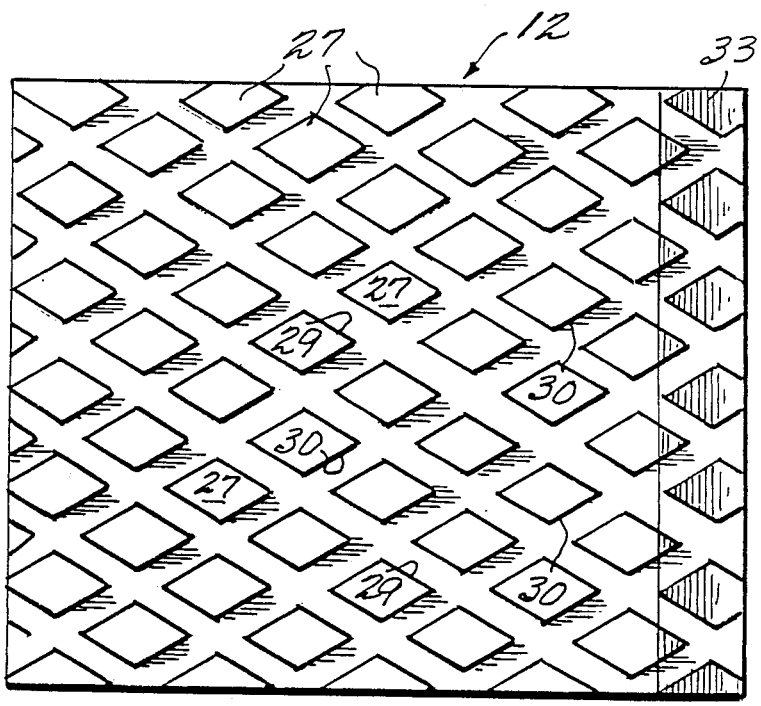
FIG. 3 is a further enlarged view of the burnishing surface of the burnishing head.

With reference to the drawings, FIGS. 1 through 5 illustrate a first embodiment of the burnishing head of the invention. The burnishing head is generally referred to by the reference numeral 11 and is shown in FIG. 1 in combination with the remainder of a burnishing apparatus (referred to generally in the art as a "certifier"). Such apparatus includes a spindle 10 upon which a computer disk 13 is mounted for rotation, which disk has a pair of opposed memory surfaces 14 and 16. While there are various types of computer memory disks, the invention is particularly applicable to thin-film magnetic media disks in which the disk includes a substrate having thin magnetic films, such as of cobalt or cobalt alloys, also with a protective layer such as of carbon, on its surfaces, providing magnetic media which can store via magnetic domain reversals or polarities differing digital representations of information. Disk 13 is mounted on spindle 10 for rotation via a central aperture (not shown) through which the spindle projects. The disk is held in position via a shoulder 17 and releasable cap nut 18 or the like which bears against the central portion of the disk's upper surface. Means, schematically represented by motor 19, are provided for rotating the spindle and, hence, the disk 13.

Burnishing head 11 includes a body 12 fixedly mounted in cantilevered fashion from a suspension arm 21 extending from a mounting structure represented schematically at 22. A driver represented at 23 is provided to move the mounting structure and the burnishing head inwardly and outwardly relative to the disk as represented by arrow 24. This inward and outward movement is to change the location of the head relative to the disk to change areas which are burnished and, in this connection, is slow compared to the rotation of the disk and can be ignored insofar as contributing to the burnishing and cutting action is concerned.

As best illustrated in FIG. 2, disk 13 has a circular periphery and is rotated angularly in the direction represented by the arrow 26. The body 12 of the burnishing head 11 most desirably is maintained in contact with the surface 14 of the disk in order to provide the burnishing action. (The pressure with which the contact is maintained will be discussed below.)

Figure 4:
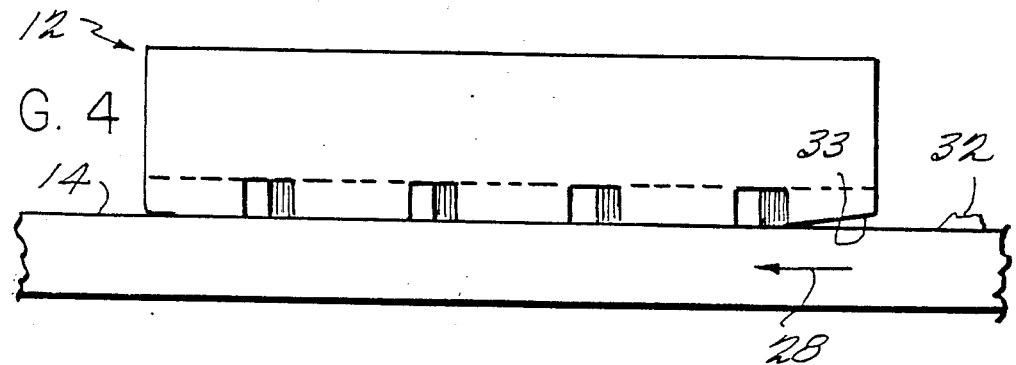
FIG. 4 is an elevation view of the burnishing head in contact with a computer disk memory surface, shown partially in section.

In keeping with the invention, the body 12 is generally provided with a planar surface having a multiple number of cutters in line with one another. Each of the cutters can be simply furnished by providing the planar surface of the body with depressions to define cutting edges at the intersections of the depression walls and the planar surface. The cutting surfaces of the body most desirably are provided by a generally regular pattern of diamond-shaped protrusions 27. The material of the body and, hence, the protrusions providing the cutters, is selected to be significantly harder than the material of the surface to be burnished. A suitable material for the body, when the disk surface is provided by a carbon layer as aforesaid, is an aluminum oxide-titanium carbide composite, such as that sold by Minnesota Mining and Manufacturing, with the designation 204A. As illustrated in FIG. 4, during revolution of the disk, the relative burnishing movement between the body 12 and the disk surface 14 is that represented by the arrow 28. During such movement, each of the diamond-shaped protrusions 27 presents to asperities 32 on the disk surface two linear cutting edges 29 and 30 which intersect at a point. The depressions in the planar burnishing surface of the body not only define the individual diamond-shaped protrusions, but also define channels which separate such protrusions from one another. As will be discussed in more detail hereinafter, such channels accept debris from protrusions which are removed from the disk surface to inhibit gouging or the like.

As mentioned previously, the construction of the burnishing head of the invention assures that a plurality of cutters is presented to each single spot on the surface to be burnished. This can be seen with reference to FIGS. 2 and 3. Such a single spot is represented at 31 in FIG. 2. It will be seen that as the disk angularly rotates in the direction represented by arrow 26, such spot will be passed beneath the body 12 of the burnishing head and during its passage will encounter sequentially a multiple number of the cutting edges 29 and 30 provided by the protrusions 27. Moreover, the body 12 will actually burnish an area extending radially of the disk during such rotation. In other words, upon the relative movement caused by rotation of the disk, the burnishing head simultaneously will present a multiple number of cutters to more than one spot extending radially of the disk (orthogonal to the direction of movement).

Figure 5:
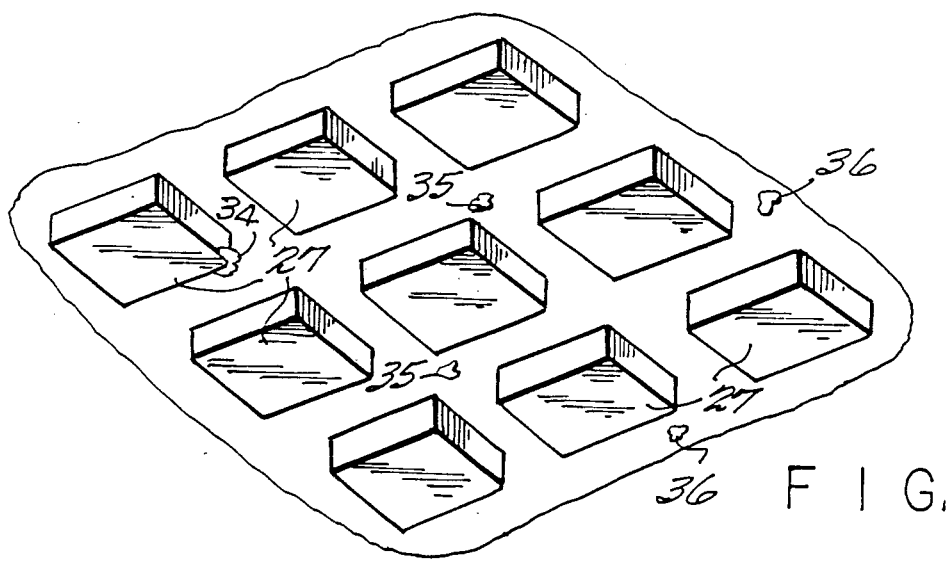
FIG. 5 is an isometric view of the interaction between an asperity and the burnishing surface.

The multiple interaction between any asperity on the disk surface and the burnishing head will result in the asperity being cleanly removed in a manner minimizing disruptions in the movement of the head and/or unwanted gouging of the disk surface. The cutting action of the head relative to such a protrusion is best illustrated in FIGS. 4 and 5. First of all, that portion of the body 12 which first confronts an asperity, such as is represented at 32 in FIG. 4, is provided with a leading edge ramp 33 to facilitate the initial confrontation and remove the upper portions of the asperity. That is, as is illustrated, the ramp 33 is inclined away from the disk surface relative to the following main cutting section of the body. This ramp includes the diamond-shaped protrusions providing cutting edges so that the upper portions of the asperity will be removed before it is subjected to the cutting action of the main cutting section. It is to be noted that since the orientation of the head relative to the disk is maintained fixed by the suspension arm, it is only necessary in this embodiment to provide a ramp face on one side of the rectangular head body.

FIG. 5, a bottom isometric view, illustrates the interaction between an asperity represented at 34 and a plurality of diamond-shaped protrusions 27. As illustrated, the asperity is in engagement with one of such protrusions which will remove all or a portion of the asperity that is remaining after it has engaged the two preceeding protrusions 27. Debris from such earlier encounters represented at 35 and 36 is illustrated in the channels between protrusions. The method of the invention includes mounting the burnishing head so that optimum cutting action is achieved. It will be seen that with the diamond-shaped protrusion construction provided, each of the asperities will be presented at an angle with a cutting edge during rotation of the disk surface. The result is that each asperity is sliced from one side to the other by a cutting edge, rather than confronted all at one time by a cutting edge. For example, referring to FIG. 3, first the asperity is contacted by an edge 30 and then by an edge 29 and so on progressively on each side of the asperity until it is completely cut away. It will be noted that because of its fixed mounting, the head will be maintained in the appropriate orientation relative to the angular disk movement for such optimum cutting.

The amount of pressure with which the burnishing head should be maintained in engagement with the disk surface is dependent upon many factors, including the relative hardness between the burnishing material and the disk surface to be burnished, the speeds of rotation, etc. It has been found that when the disk surface is a sputtered carbon surface, the material of the burnishing head body is the aforesaid aluminum oxide-titanium carbide composite, the head surface area is approximately 0.125 by 0.157 inches and the disk rotational speed is about 200 RPM, an appropriate pressure can be achieved by placing a force of about 15 grams on the head, as conveniently provided by the spring force of suspension arm 21 typically used with read/write heads.

It is particularly desirable that the leading edge of a contact burnishing head, such as the head 11, include a leading edge ramp face. Such leading ramp facilitates the burnishing process. Including the same, though, creates an inventory problem in that the direction of movement of a disk surface relative to a burnishing head depends on whether the surface to be burnished is an upper disk surface or a lower disk surface. The embodiment of the invention illustrated in FIG. 6 is designed to circumvent such inventory problem. More particularly, each of the two illustrated burnishing head bodies 12' is provided with a pair of ramp faces 33' inclined away from the surface to be burnished. Thus, both bodies 12' present a leading ramp face to the respective surfaces to be burnished, regardless of whether suspension arm 21 presents the attached head 11' from above the disk to burnish the upper disk surface 14 or from below the disk to provide burnishing of the lower surface 16.

While the invention has been described in detail in connection with preferred embodiments thereof, it will be appreciated by those skilled in the art that various changes and modifications can be made without departing from its spirit. For example, although the preferred embodiments are contact heads, features of the invention also can be incorporated into flying heads. Moreover, the opposed ramp concept may well be utilized in contact or flying burnishing head arrangements having burnishing surfaces which are different than the diamond-shaped protrusion surfaces described herein. It is therefore intended that the coverage afforded applicant be limited only by the claims.

What I claim is:

1. A contact burnishing head for memory surfaces of computer disks comprising a body having a multiple number of cutters comprising protrusions in line with one another in four different directions forming successively aligned cutting edges for sequential reduction of a surface asperity, said body having at least one channel adjacent each of said cutters to accept debris removed from a disk surface; means for maintaining the cutters of said body and said channel in contact with a disk surface to be burnished; and means for providing relative movement between said body and said disk surface to present said successively aligned cutting edges sequentially to a single asperity to be burnished on said disk surface and maintaining said channel oblique to the direction of movement between said disk surface and said body.

2. A contact burnishing head according to claim 1 wherein the surface of said body having said cutters is generally planar at said cutters, and each of said cutters comprises one or more cutting edges defined by depressions in said surface, said depressions providing a plurality of said channels for debris.

3. A contact burnishing head according to claim 1 wherein said means for causing movement of said body relative to said disk causes angular relative movement between the same in a single direction.

4. A contact burnishing head according to claim 1 wherein said surface of said head is defined by a generally regular pattern of diamond-shaped protrusions, each of which provides two linear cutting edges which intersect at a point and each of which is separated from the adjacent diamond-shaped protrusions by a channel, the cutting edges of each of said protrusions facing generally in the single direction of relative movement between said body and said disk.

5. A contact burnishing head according to claim 1 in which that portion of said body including said multiple number of cutters which first confronts a surface asperity on the surface of said disk is provided with a leading edge ramp that is inclined away from said disk surface relative to a following section of said head surface providing said cutters.

6. A contact burnishing head according to claim 5 further including an inclined trailing edge which succeeds said following section during said relative movement.

7. A contact burnishing head according to claim 1 wherein said body has a multiple number of said cutters both in line with one another to be presented sequentially to a single spot on the surface of said disk and in a direction generally orthogonal thereto to sweep more than one spot of said disk surface upon said relative movement.

8. A contact burnishing head according to claim 1 wherein said cutters are provided as cutting edges in a generally planar surface of said burnishing head.

9. A contact burnishing head according to claim 8 wherein said surface of said head is defined by a generally regular pattern of diamond-shaped protrusions, each of which provides two linear cutting edges which intersect at a point and each of which is separated from adjacent diamond-shaped protrusions by a channel.

10. A method of burnishing the surface of a memory disk comprising the steps of:
(a) providing a contact burnishing head presenting a plurality of cutters comprising protrusions in line with one another in four different directions forming successively aligned cutting edges and at least one channel adjacent each of said cutters to accept debris from a disk surface;
(b) mounting said head in contact with a memory disk surface to be burnished at an orientation presenting said cutters to said surface for cutting action of said cutters relative to said surface; and
(c) moving said burnishing head body relative to said disk surface to present said successively aligned cutting edges sequentially to a single spot on the surface of said disk to be burnished while maintaining said channel oblique to the direction of said relative movement.

11. A method according to claim 10 wherein said step of moving said body relative to said disk comprises moving the same to present at least two of said cutters sequentially to a single spot on the surface of said memory disk.

12. A method according to claim 11 wherein said cutters are provided by depressions in a generally flat surface of said burnishing head which form cutting edges at the junctions between said depressions and said surface, and further comprising the step of contacting said surface of said disk to be burnished with said flat surface of said burnishing head to provide said sequential presentation of cutters of said single spot.

13. A method according to claim 10 wherein each of said cutters provides one or more linear cutting edges and said step of mounting said head at an orientation presenting said cutters to the memory disk surface to be burnished comprises mounting said head to present a cutting edge of each of said cutters at an angle to the relative direction of movement between said disk surface and said burnishing head body, and further comprising the step of maintaining said angular relationship between each of said cutting edges and said direction of relative movement during said movement.

14. A contact burnishing head for memory surfaces of computer disks comprising a body having a burnishing surface defined by a generally regular pattern of protrusions, each of which provides at least two linear cutting edges which intersect at a point and each of which is separated from adjacent protrusions by channels for accepting debris removed from a disk surface; means for maintaining at least a portion of the burnishing surface in contact with a disk surface to be burnished; and means for providing relative movement between said body and said disk surface presenting said cutting edges to said disk surface while maintaining said channels oblique to the direction of said relative movement.

* * * * *